United States Patent [19]

Purcell

[11] Patent Number: 5,586,070

[45] Date of Patent: Dec. 17, 1996

[54] STRUCTURE AND METHOD FOR EMBEDDING TWO SMALL MULTIPLIERS IN A LARGER MULTIPLIER

[75] Inventor: Stephen C. Purcell, Mountain View, Calif.

[73] Assignee: Chromatic Research, Inc., Santa Clara County, Calif.

[21] Appl. No.: 285,376

[22] Filed: Aug. 3, 1994

[51] Int. Cl.[6] ............................................. G06F 7/52
[52] U.S. Cl. ............................................. 364/754; 364/757
[58] Field of Search ............................. 364/754, 757

[56] References Cited

U.S. PATENT DOCUMENTS

| | | | |
|---|---|---|---|
| 4,594,679 | 6/1986 | George et al. | 364/754 |
| 4,754,421 | 6/1988 | Bosshart | 364/754 |
| 4,809,212 | 2/1989 | New et al. | 364/754 |
| 4,811,269 | 3/1989 | Hirose et al. | 364/754 |
| 4,825,401 | 4/1989 | Ikumi | 364/757 |
| 4,868,778 | 9/1989 | Disbrow | 364/754 |
| 4,989,168 | 1/1991 | Kuroda et al. | 364/754 |
| 5,138,574 | 8/1992 | Aoki et al. | 364/754 |

FOREIGN PATENT DOCUMENTS

57-69451  4/1982  Japan.

*Primary Examiner*—Tan V. Mai
*Attorney, Agent, or Firm*—Skjerven, Morrill, MacPherson, Franklin & Friel; Alan H. MacPherson; E. Eric Hoffman

[57] ABSTRACT

A multiplier circuit which performs selectable multiplication operations on a first word having an upper byte and a lower byte and a second word having an upper byte and a lower byte. A first multiplier circuit generates a first product representative of the product of the upper bytes of the first and second words and the product of the lower bytes of the first and second words. A second multiplier circuit generates a second product representative of the product of the upper byte of the first word and the lower byte of the second word plus the product of the lower byte of the first word and the upper byte of the second word. The second multiplier circuit can be selectively disabled. When the second multiplier circuit is enabled, the multiplier circuit multiplies the first and second words. When the second multiplier circuit is disabled, the multiplier circuit multiplies the upper bytes of the first and second words and the lower bytes of the first and second words.

11 Claims, 9 Drawing Sheets

|       |       |       |       |       |       |       |       |       | X8    | Y8    |       |
|-------|-------|-------|-------|-------|-------|-------|-------|-------|-------|-------|-------|
|       |       |       |       |       |       |       |       | X8Y0  | X7Y1  | X6Y2  | *     |
|       |       |       |       |       |       |       | X8Y0  | X7Y1  | X6Y2  | X5Y3  |       |
|       |       |       |       |       |       | X8Y0  | X7Y1  | X6Y2  | X5Y3  | X4Y4  |       |
|       |       |       |       |       | X8Y0  | X7Y1  | X6Y2  | X5Y3  | X4Y4  | X3Y5  |       |

(Triangular array of partial products X$_i$Y$_j$ feeding columns P$_4$ through P$_{17}$)

| FIG. 3a | FIG. 3b |

$X_7 X_6 X_5 X_4 X_3 X_2 X_1 X_0$
$Y_7 Y_6 Y_5 Y_4 Y_3 Y_2 Y_1 Y_0$
$X_3 Y_0 \quad X_2 Y_0 \quad X_1 Y_0 \quad X_0 Y_0$
$X_2 Y_1 \quad X_1 Y_1 \quad X_0 Y_1$
$X_1 Y_2 \quad X_0 Y_2$
$X_0 Y_3$ $P_3 \quad P_2 \quad P_1 \quad P_0$

| FIG.4b | FIG.4a-2 | FIG.4a-1 |

| X | Y | Z | S | C |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

STRUCTURE AND METHOD FOR EMBEDDING TWO SMALL MULTIPLIERS IN A LARGER MULTIPLIER

FIELD OF THE INVENTION

The present invention relates to a multiplier for use in an integrated circuit. In particular, the present invention relates to a structure and method for creating a multiplier which can be selected to perform either a single large multiplication or two smaller multiplications.

BACKGROUND OF THE INVENTION

Figure 1:
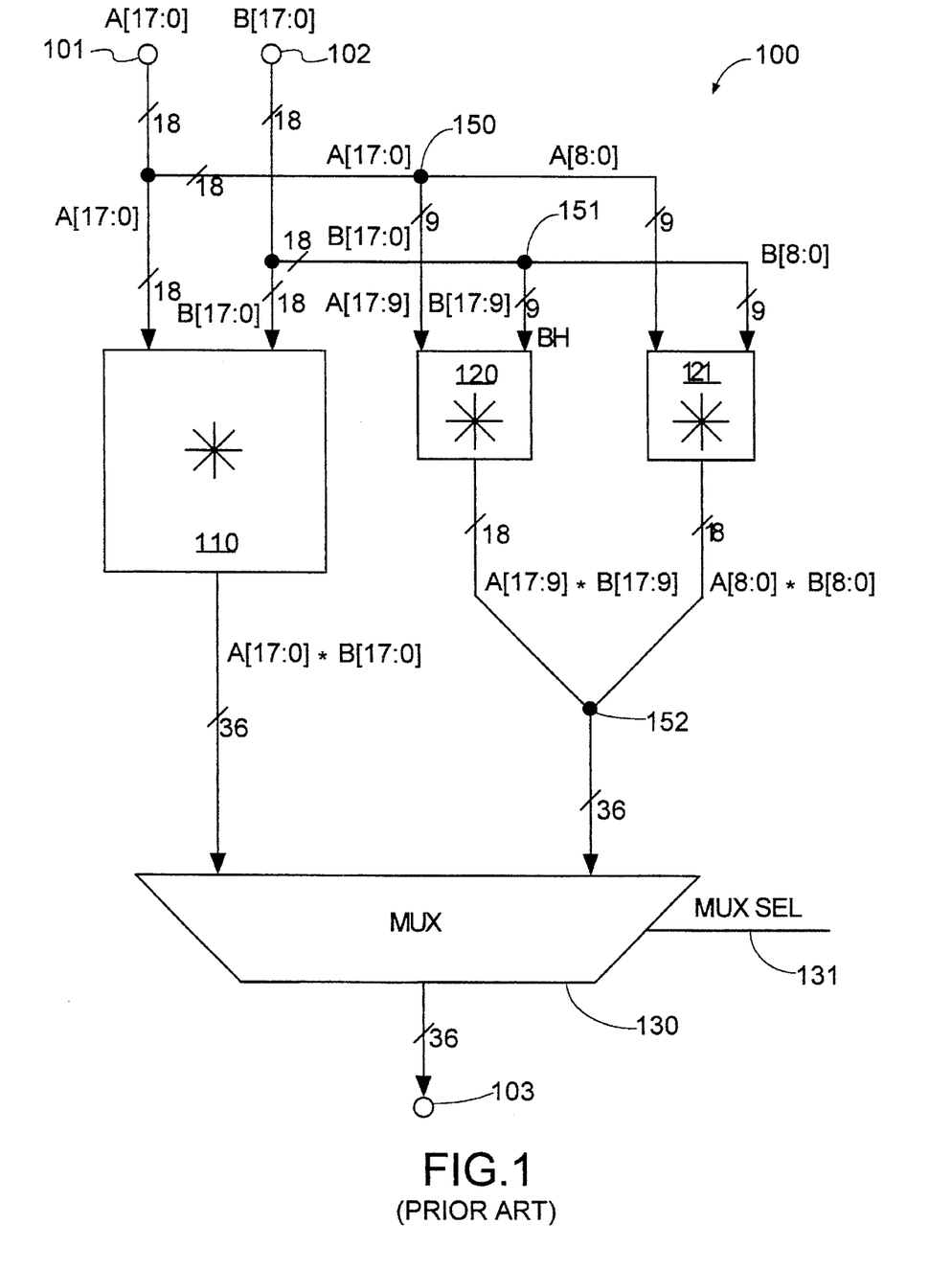
FIG. 1 is a block diagram of a prior art multiplier circuit.

FIG. 1 is a block diagram illustrating a conventional multiplier circuit 100 which performs one 18-bit multiplication or two 9-bit multiplications. Multiplier circuit 100 includes input ports 101 and 102, 18-bit multiplier 110, 9-bit multipliers 120 and 121, multiplexer 130 and output port 103. Eighteen-bit words A[17:0] and B[17:0] are provided to multiplier circuit 100 at input ports 101 and 102, respectively. Eighteen-bit word A[17:0] consists of a 9-bit upper byte A[17:9] and a 9-bit lower byte A[8:0]. Similarly, 18-bit word B[17:0] consists of a 9-bit upper byte B[17:9] and a 9-bit lower byte B[8:0].

To perform an 18-bit multiplication, 18-bit words A[17:0] and B[17:0] are provided to 18-bit multiplier 110. 18-bit multiplier 110 is a conventional device which contains at least four 9-bit multipliers similar to 9-bit multipliers 120 and 121. The output signal of 18-bit multiplier 110 is a 36-bit (in parallel) word output signal which is equal to the product of A[17:0] and B[17:0]. A multiplexer select signal on lead 131 causes multiplexer 130 to route the 36 output bits of 18-bit multiplier 110 to output port 103.

Multiplier circuit 100 is also capable of performing two 9-bit multiplications. To do this, 9-bit upper byte A[17:9] is multiplied by 9-bit upper byte B[17:9] to form a first 18-bit product and 9-bit lower byte A[18:0] is multiplied by 9-bit lower byte B[8:0] to form a second 18-bit product. Thus, 18-bit word A[17:0] is separated into two 9-bit bytes A[17:9] and A[8:0] at port 150. Nine-bit byte A[17:9] is provided to an input bus of multiplier 120 and 9-bit byte A[8:0] is provided to an input bus of multiplier 121. Similarly, 18-bit word B[17:0] is separated into two 9-bit bytes B[17:9] and B[8:0] at port 151. Nine-bit byte B[17:9] is provided to an input bus of multiplier 120 and 9-bit byte B[8:0] is provided to an input bus of multiplier circuit 121.

Nine-bit multiplier 120 is a conventional multiplier circuit which produces an 18-bit word equal to A[17:9]*B[17:9]. Nine-bit multiplier 121 is typically identical to 9-bit multiplier 120. Thus, the output signal of 9-bit multiplier 121 is equal to A[8:0]*B[8:0]. The output signals of multipliers 120 and 121 are concatenated at port 152, resulting in a 36-bit output signal. The upper half of this 36-bit output signal is equal to the product of A[17:9] and B[17:9] and the lower half of this 36-bit output signal is equal to the product of A[8:0] and B[8:0]. Consequently, the two 9-bit multiplications previously described have been performed. A multiplexer select signal on lead 131 causes multiplexer 130 to route the 36-bit output signal of concatenation port 152 to output port 103.

Because multiplier circuit 100 requires an 18-bit multiplier 110, two 9-bit multipliers 120 and 121, and multiplexer 130, the area required to fabricate multiplier circuit 100 is significant. Because of the desire to minimize the layout area of integrated circuits, it would be advantageous to have a multiplier circuit with a reduced area which is capable of selectably performing either a large multiplication or two small multiplications.

SUMMARY OF THE INVENTION

In accordance with the present invention, first and second words are provided to respective first and second input ports of a multiplier circuit. Both words have an upper byte and a lower byte. The multiplier circuit can be selected to multiply the first and second words in a first mode. The multiplier circuit can also be selected to multiply the upper bytes of the first and second words and the lower bytes of the first and second words in a second mode.

In one embodiment, the multiplier circuit has four multipliers. In the first mode, all four multipliers are used to multiply the first and second words. In the second mode, two of the four multipliers are effectively disabled by a multiplier select signal and the remaining two multipliers are used to multiply the upper bytes of the first and second words and the lower bytes of the first and second words.

In one embodiment of the present invention, a first multiplier is coupled to the first and second input ports in such a manner as to receive the upper bytes of the first and second words. In response, the first multiplier circuit generates a first product equal to the product of these upper bytes.

A second multiplier is coupled to the first and second input ports in such a manner as to receive the lower bytes of the first and second words. In response, the second multiplier circuit generates a second product equal to the product of these lower bytes.

A third multiplier is coupled to the second input port and the first gating circuit in such a manner as to receive the lower byte of the second word and the output signal of a first gating circuit. In response, the third multiplier circuit generates a third product equal to the product of the lower byte of the second word and the output signal of the first gating circuit.

A fourth multiplier is coupled to the second input port and a second gating circuit in such a manner as to receive the upper byte of the second word and the output signal of the second gating circuit. In response, the fourth multiplier circuit generates a fourth product equal to the product of the upper byte of the second word and the output signal of the second gating circuit.

The first gating circuit is coupled to the first input port in such a manner as to receive the upper byte of the first word and the multiplier select signal. The second gating circuit is coupled to the first input port in such a manner to receive the lower byte of the first word and the multiplier select signal. The multiplier select signal determines whether the first and second gating circuits pass the upper and lower bytes of the first word, respectively, or zero values.

When the multiplier select signal is in a first state, the first mode of the multiplier circuit is selected and the first and second gating circuits pass the upper and lower bytes of the first word, respectively.

When the multiplier select signal is in a second state, the second mode of the multiplier circuit is selected and the output signals of the first and second gating circuits are zero.

Another embodiment of the present invention includes a method of selectably multiplying a first word having an upper byte and a lower byte and a second word having an upper byte and a lower byte. The upper byte of the first word is multiplied with the upper byte of the second word to create a first product. The lower byte of the first word is multiplied with the lower byte of the second word to create a second product. The first and second products are then concatenated to form a first concatenated word.

The lower byte of the first word is multiplied with a selectable signal to create a first byte and the upper byte of the first word is multiplied with the selectable signal to create a second byte. The first byte is multiplied with the upper byte of the second word to create a third product and the second byte is multiplied with the lower byte of the second word to create a fourth product. The third and fourth products are then added to create a first sum.

The selectable signal is selected to be one to perform the multiplication of the two words. The selectable signal is selected to be zero to perform the multiplication of the upper bytes of the first and second words and the multiplication of the lower bytes of the first and second words.

The present invention will be more fully understood in view of the following drawings taken together with the detailed description.

BRIEF DESCRIPTION OF THE DRAWINGS

FIG. 3, which consists of FIGS. 3a and 3b, is a schematic diagram illustrating longhand multiplication of two 9-bit numbers to obtain an 18-bit product;

FIG. 5b is a truth table for the carry save adder of FIG. 5a; and

DETAILED DESCRIPTION OF THE INVENTION

Figure 2:
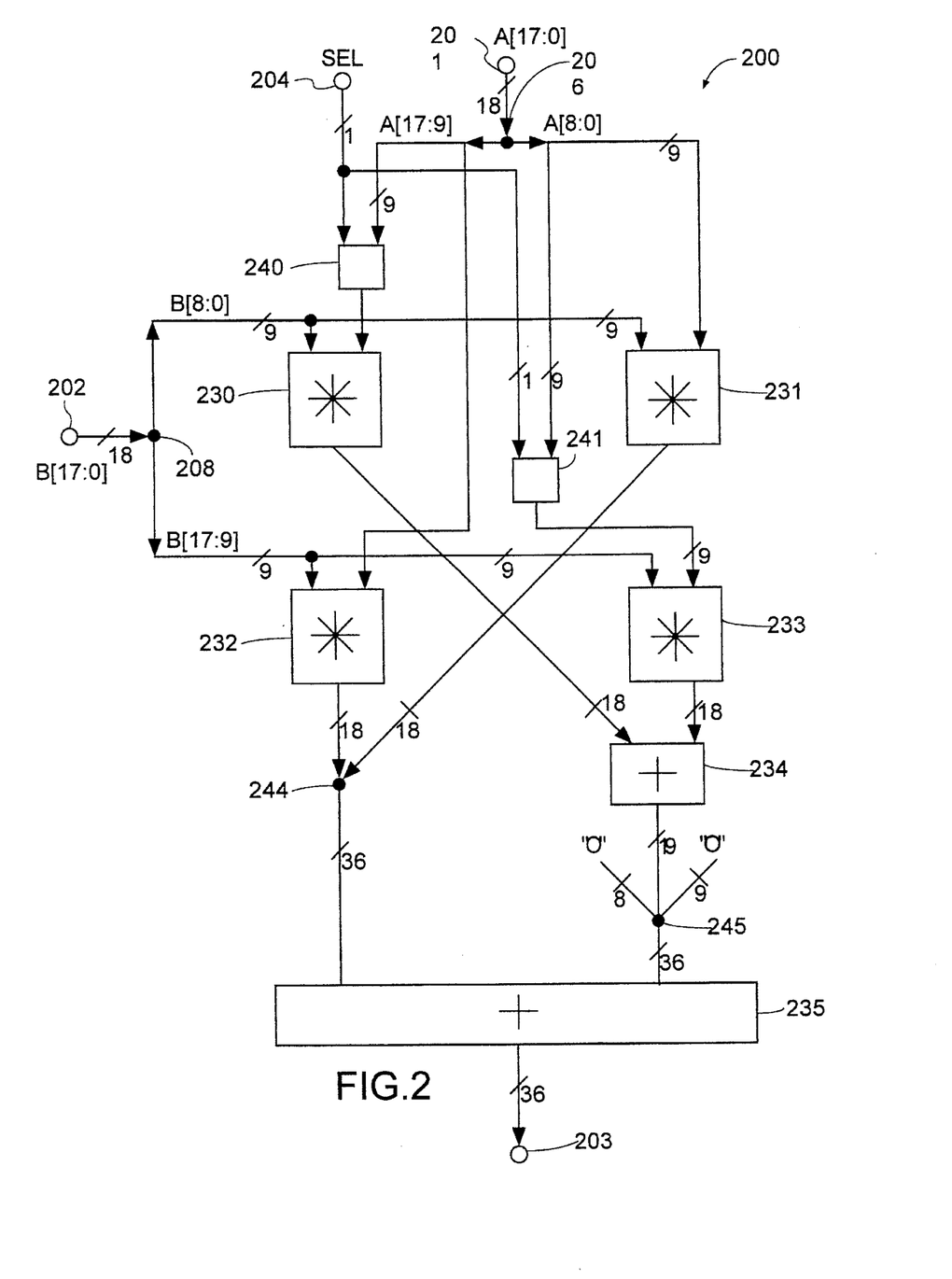
FIG. 2 is a block diagram of a multiplier circuit in accordance with one embodiment of the present invention.

FIG. 2 is a block diagram of multiplier circuit 200 in accordance with one embodiment of the present invention. Although the present invention is described in connection with circuitry which performs either an 18-bit multiplication or two 9-bit multiplications, the present invention is easily modified to perform multiplications with other numbers of bits.

The multiplication of two 18-bit words A[17:0] and B[17:0] to create a 36-bit output signal C[35:0] can be defined in the following long-hand form.

$$\begin{array}{r} A[17:9] \quad A[8:0] \\ *\ B[17:9] \quad B[8:0] \\ \hline A[17:9]*B[8:0] \quad A[8:0]*B[8:0] \end{array}$$

$$\begin{array}{r} A[17:9]*B[17:9] \quad A[8:0]*B[17:9] \\ \hline A[17:9]B[17:9] + (A[17:9]*B[8:0] + A[8:0]*B[17:9]) + A[8:0]*B[8:0] \\ *2^{18} \qquad\qquad *2^{9} \qquad\qquad *2^{0} \end{array}$$

Thus, four 9-bit multiplications are performed to create four 18-bit products, A[17:9]*B[8:0], A[8:0]*B[8:0], A[17:9]*B[17:9] and A[8:0]*B[17:9]. As indicated in the above equation, 18-bit product A[8:0]*B[8:0] contributes to the value of the lower 18-bits C[17:0] of the resultant 36-bit product (i.e., product A[8:0]*B[8:0] is multiplied by $2^0$). Similarly, the 18-bit product A[17:9]*B[17:9] contributes to the value of the upper 18-bits C[35:18] of the resultant 36-bit product (i.e., product A[17:9]*B[17:9] is multiplied by $2^{18}$). Finally, the sum of 18-bit products A[17:9]*B[8:0] and A[8:0]*B[17:9] contribute to the value of the middle 19-bits C[27:9] of the resultant 36-bit product (i.e., A[17:9]*B[8:0]+A[8:0]*B[17:9] is multiplied by $2^9$).

Multiplier circuit 200 performs the above-described 18-bit multiplication as follows. Eighteen-bit word A[17:0] is provided to input port 201 and is divided into two 9-bit bytes A[17:9] and A[8:0] at port 206. Nine-bit upper byte A[17:9] is provided to an input bus of gating circuit 240 and to an input bus of 9-bit multiplier 232. Nine-bit lower byte A[8:0] is provided to an input bus of gating circuit 241 and an input bus of 9-bit multiplier 231. In one embodiment, 9-bit multipliers 230 and 231 utilize conventional Wallace tree adders.

Figures 3, 3A:
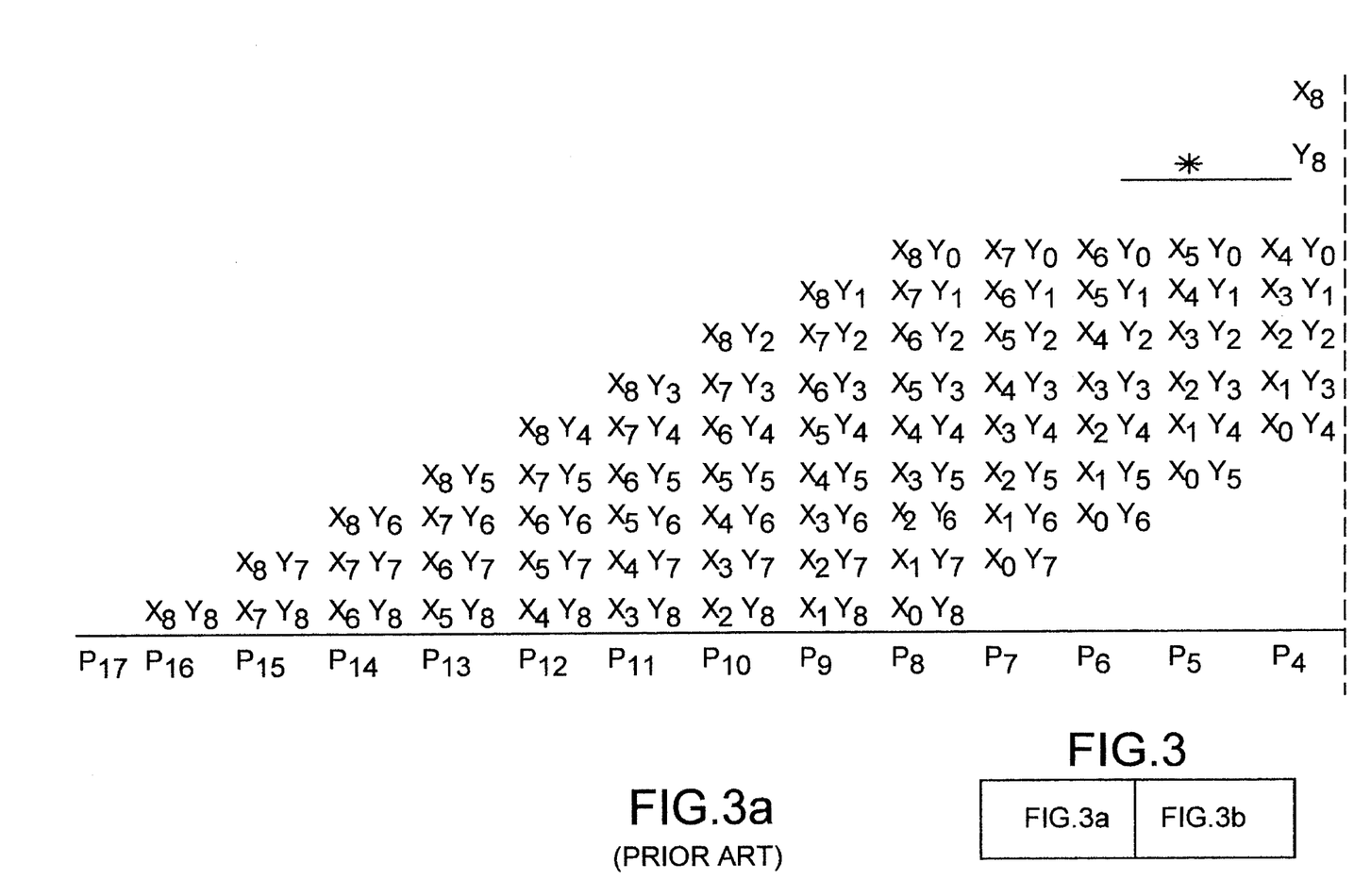
Figure 3B:
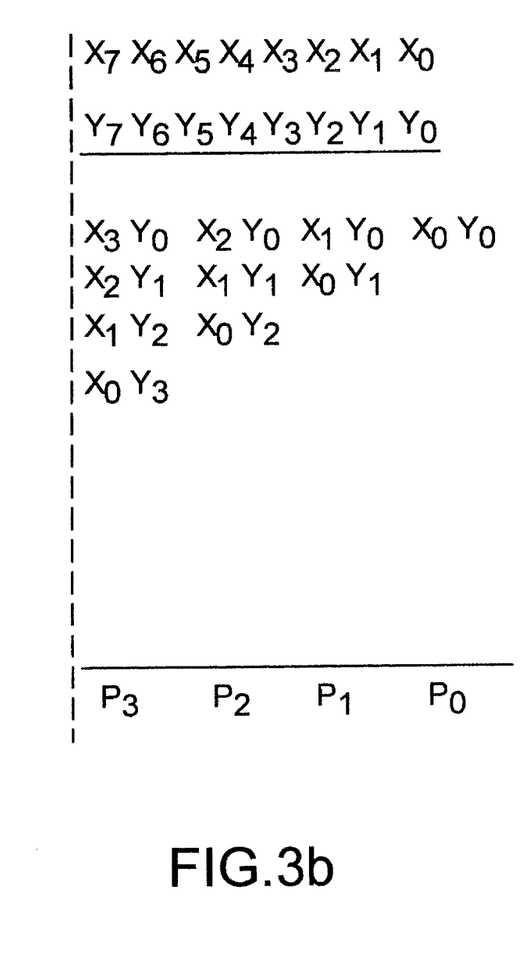
Figure 4:
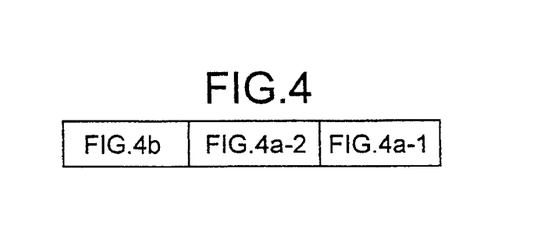
FIG. 4 is a schematic diagram of a conventional 9-bit Wallace tree adder (FIG. 4 consists of FIGS. 4A-1, 4A-2 and 4b)
Figure 4A:
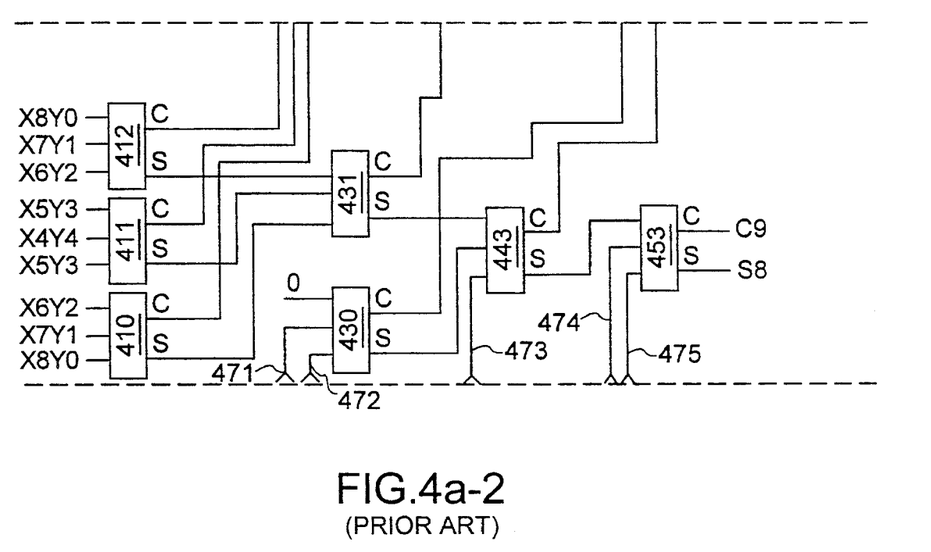
Figure 4A:
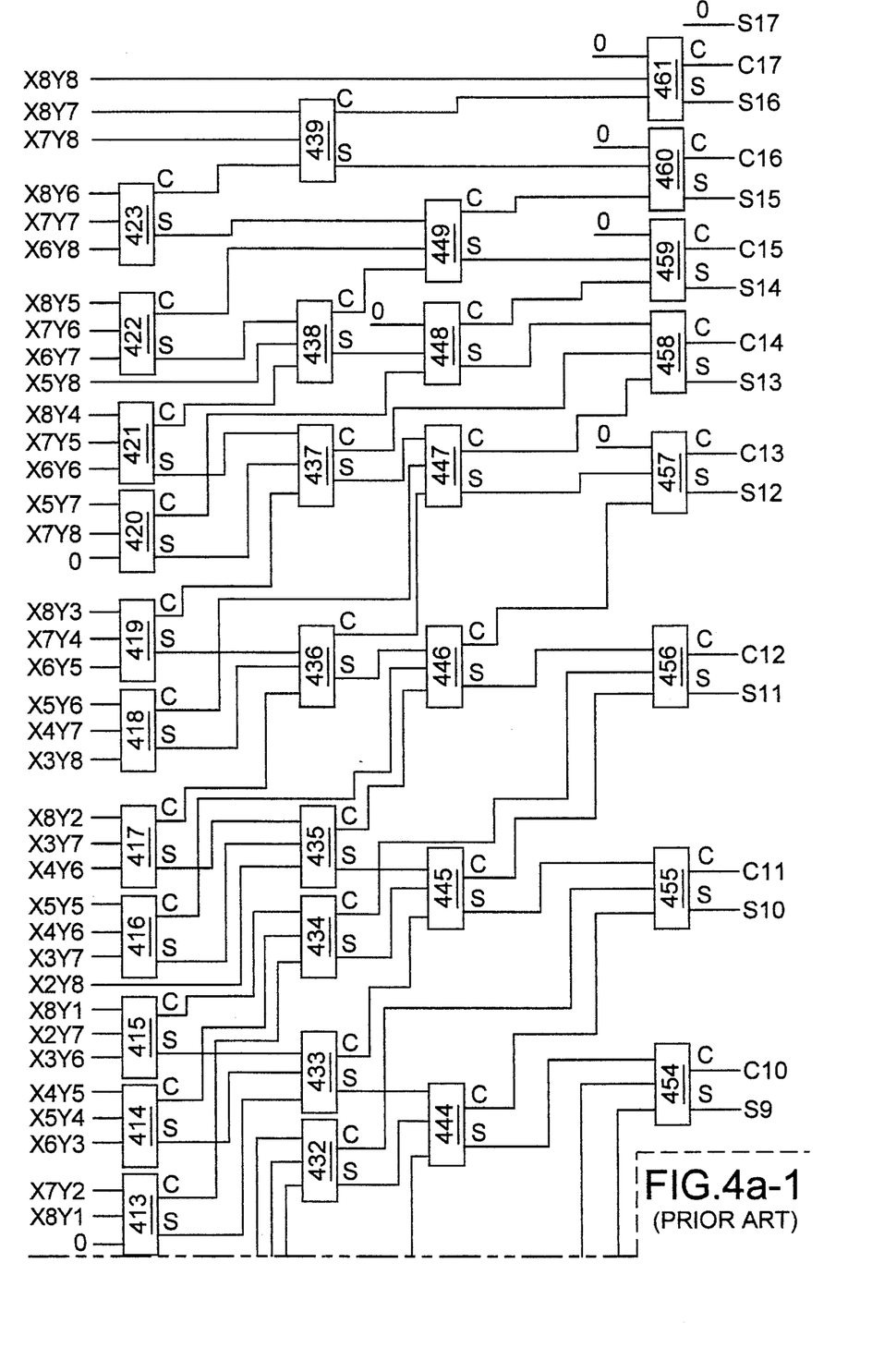
Figure 4B:
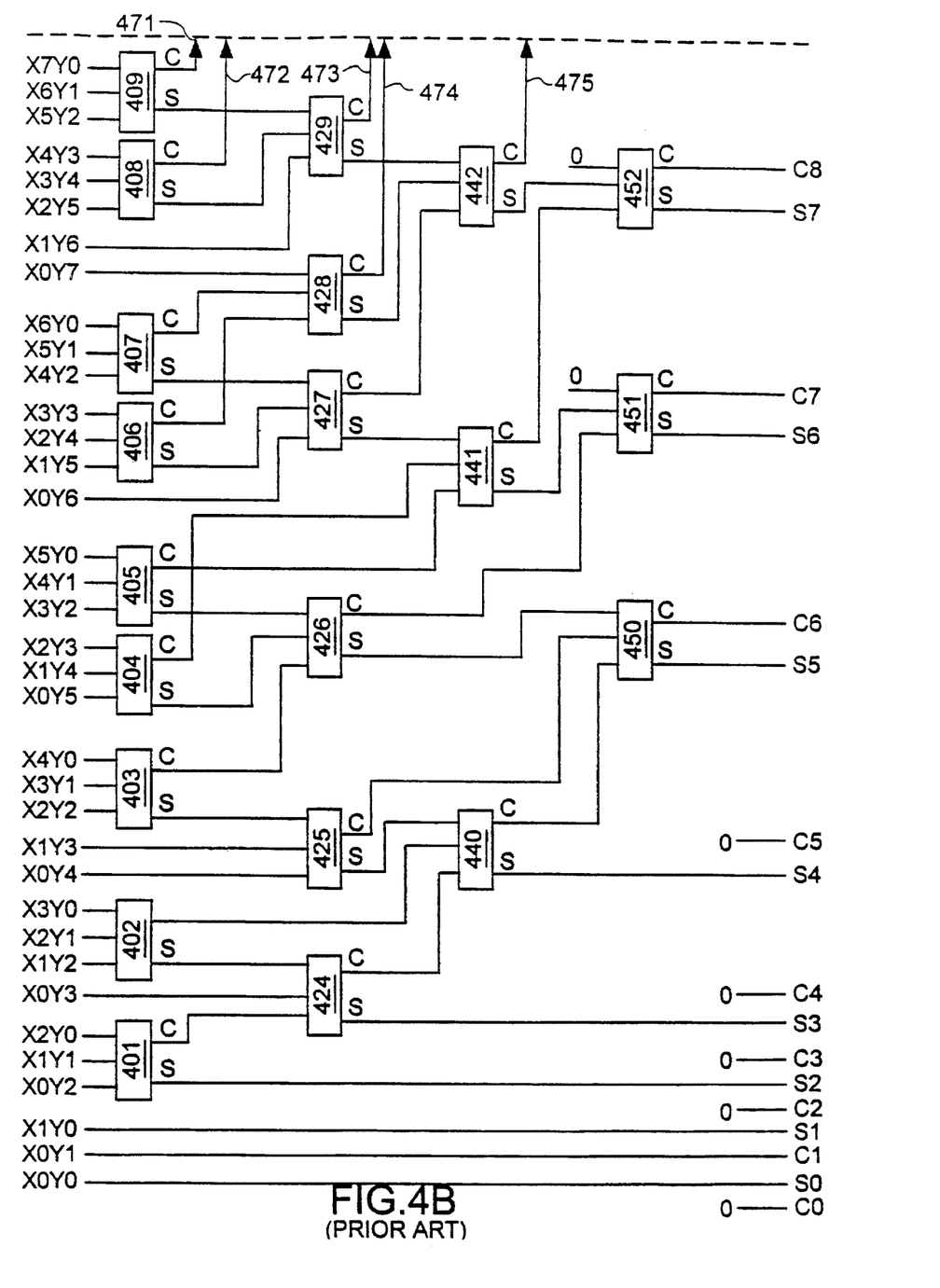
Figure 5A:
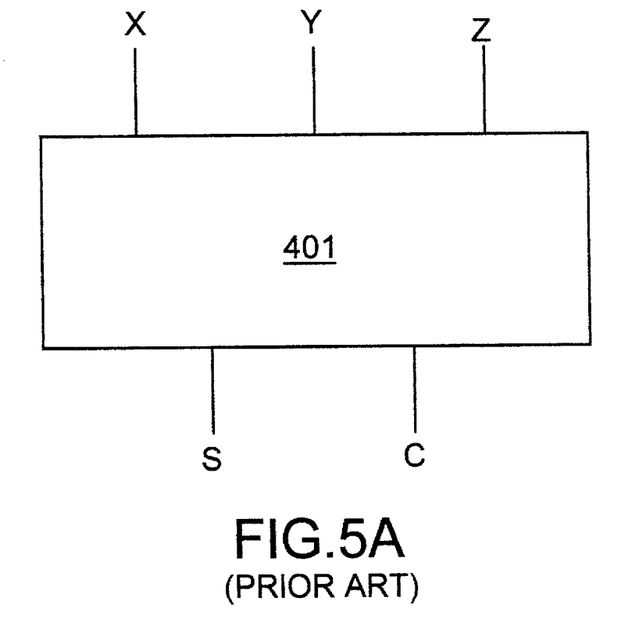
FIG. 5a is a schematic diagram of a carry save adder.
Figure 5B:
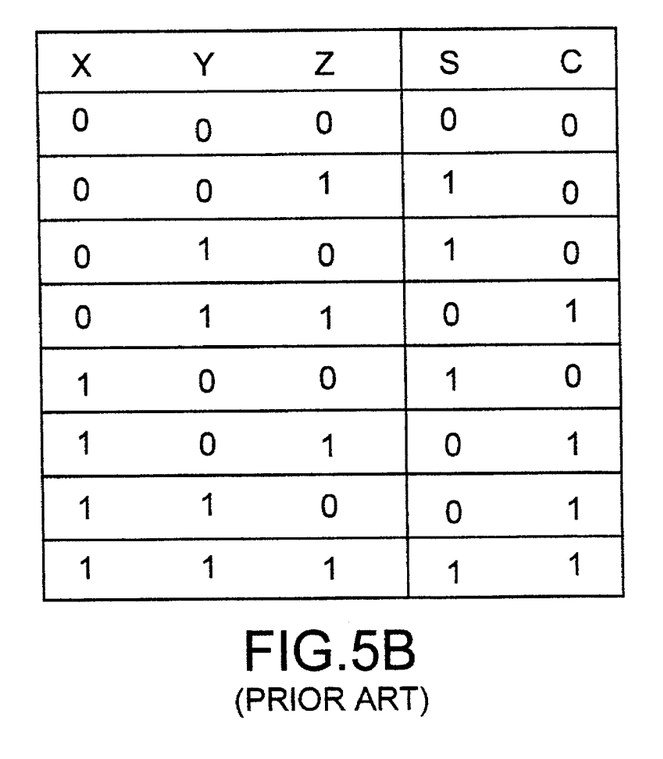

FIG. 3, which consists of FIGS. 3a and 3b, is a schematic diagram illustrating a longhand multiplication of two 9-bit numbers X[8:0] and Y[8:0] to obtain 18-bit product P[17:0]. FIG. 4 is a schematic diagram of a conventional 9-bit Wallace tree adder 400 which can be used to multiply 9-bit numbers X[8:0] and Y[8:0]. FIG. 4 consists of FIGS. 4a-1, 4a-2 and 4b. Leads 471–475 couple FIGS. 4a and 4b as illustrated. Carry save adders 401–461 of Wallace tree adder 400 are used to create sum bits S[17:0] and carry bits C[17:0]. Sum bits S[17:0] and carry bits C[17:0] are added in a carry propagate adder (not shown) to create product P[17:0] (FIG. 3). FIG. 5a is a schematic diagram of carry save adder 401 and FIG. 5b is a truth table for carry save adder 401. Carry save adders 402–461 are identical to carry save adder 401.

Returning now to FIG. 2, a 1-bit multiplier select signal is provided at port 204. This multiplier select signal is typically generated in response to a system operation code and is routed to input leads of gating circuits 240 and 241. As described in more detail later, the multiplier select signal determines whether multiplier circuit 200 operates as an 18-bit multiplier or two 9-bit multipliers. The output signals of gating circuits 240 and 241 are provided to input buses of 9-bit multipliers 230 and 233, respectively.

An 18-bit word B[17:0] is provided to input port 202. Eighteen-bit word B[17:0] is separated into 9-bit upper byte B[17:9] and 9-bit lower byte B[8:0] at port 208. Lower byte B[8:0] is provided to input buses of 9-bit multipliers 230 and 231 and upper byte B[17:9] is provided to input buses of 9-bit multipliers 232 and 233. In one embodiment, 9-bit multipliers 232 and 233 are identical to 9-bit multipliers 230 and 231.

The output signals of multipliers 231 and 232 are provided to concatenation port 244. The output signal of concatenation port 244 is provided to summing circuit 235. The output signals of multipliers 230 and 233 are provided to summing circuit 234. The output signal of summing circuit 234 is transmitted through concatenation port 245 to summing circuit 235. The output signal of summing circuit 235 is provided to output port 203.

Figure 6:
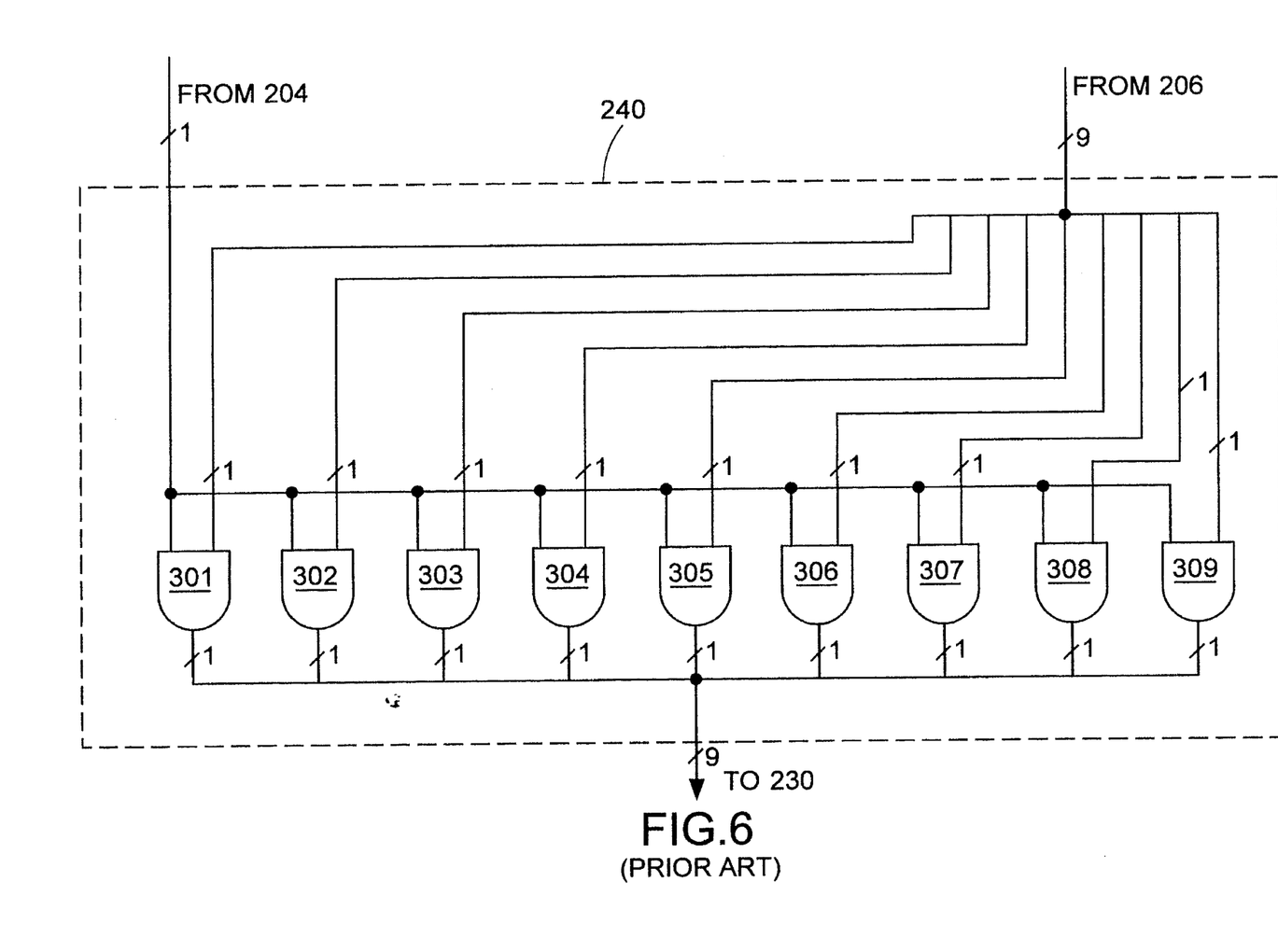
FIG. 6 is a schematic diagram of a gating circuit in accordance with one embodiment of the present invention.

Multiplier circuit 200 operates as follows. To perform an 18-bit multiply, the multiplier select signal at input port 204 is set to a logic high level, thereby providing a high signal to gating circuit 240. FIG. 6 is a schematic diagram of one embodiment of gating circuit 240. The multiplier select signal is provided to an input lead of each of AND gates 301–309. Each bit of byte A[17:9] is applied to an input lead of one of AND gates 301–309. Gating circuit 240 thereby performs a logical AND operation on each of the bits in upper byte A[17:9]. The high input signal from input port 204 causes upper byte A[17:9] to be transmitted through gating circuit 240 to an input bus of multiplier 230. Although gating circuit 240 is described in connection with a single embodiment, it is understood that other gating circuits can be substituted for gating circuit 240 without departing from the scope of the present invention.

In one embodiment of the present invention, gating circuit 241 is formed in the same manner as gating circuit 240. Thus, the high input signal at input port 204 causes lower byte A[8:0] to be transmitted through gating circuit 241 to an input bus of multiplier 233.

As a result, the output signal of multiplier 230 is an 18-bit product equal to A[17:9]*B[8:0], the output signal of multiplier 231 is an 18-bit product equal to A[8:0]*B[8:0], the output signal of multiplier 232 is an 18-bit product equal to A[17:9]*B[17:9], and the output signal of multiplier 233 is an 18-bit product equal to A[8:0]*B[17:9].

The output signals of multipliers 231 and 232 are concatenated at port 244 to produce a 36-bit output signal. The upper 18-bits of this output signal are equal to the 18-bit product A[17:9]*B[17:9] and the lower 18-bits of this output signal are equal to the 18-bit product A[8:0]*B[8:0]. The output signal of concatenation port 244 is therefore equal to:

$$A[17:9]*B[17:9]*2^{18}+A[8:0]*B[8:0]*2^{0}.$$

The output signals of multipliers 230 and 233 are added in summing circuit 234. Thus, the output signal of summing circuit 234 is equal to:

$$A[17:9]*B[8:0]+A[8:0]*B[17:9].$$

The output signal of summing circuit 234 has 19-bits to include any carry bit required by the addition of the two 18-bit input words. The 19-bit output signal of summing circuit 234 is provided to concatenation port 245 where 8 "zero" bits are added at the beginning of the 19-bit output signal and 9 "zero" bits are added after the 19-bit output signal of summing circuit port 234. The 36-bit output signal of concatenation port 245 is therefore equal to:

$$(A[17:9]*B[8:0]+A[8:0]*B[17:9])*2^{9}.$$

The 36-bit output signal of concatenation port 245 is provided to summing circuit 235. Summing circuit 235 adds the output signals of concatenation ports 244 and 245 to produce a 36-bit output signal at output port 203 which is equal to:

$$A[17:9]*B[17:9]*2^{18}+(A[17:9]*B[8:0]+A[8:0]*B[17:9])*2^{9}+A[8:0]*B[8:0]*2^{0}$$

(i.e. the product of 18-bit words A[17:0] and B[17:0]).

To perform two 9-bit multiplications, the multiplication select signal at port 204 is set to a logic low state. This causes the 9-bit output signals of gating circuits 240 and 241 to be zero. Consequently, the output signals of multipliers 230 and 233 are zero. As a result, the output signals of summing circuit 234 and concatenation port 245 are also zero. Multipliers 231 and 232 operate as previously discussed in connection with the 18-bit multiplication. Thus, the upper 18-bits of the 36-bit output signal of concatenation port 244 are equal to the 18-bit product of 9-bit upper bytes A[17:9] and B[17:9]. The lower 18-bits of the 36-bit output signal of concatenation port 244 are equal to the 18-bit product of 9-bit lower bytes A[8:0] and B[8:0]. The 36-bit output signal of concatenation port 244 is passed through summing circuit 235 to output port 203 unchanged because the other input signal provided to summing circuit 235 (from concatenation port 245) is zero.

Multiplier circuit 200 thereby selectably performs either an 18-bit multiplication or two 9-bit multiplications. When compared with multiplier circuit 100 (FIG. 1), multiplier circuit 200 eliminates the need for 9-bit multipliers 120 and 121 and multiplexer 130. Thus, multiplier circuit can be fabricated with a smaller layout area than prior art multiplier circuits.

While the present invention has been described in connection with a particular embodiment, it is understood that invention is not limited to the embodiment disclosed, but is capable of various modifications which would be apparent to one of ordinary skill in the art. Thus, the present invention is limited only by the following claims.

I claim:

1. A multiplier circuit comprising:

a first input port for receiving a first word having an upper byte and a lower byte;

a second input port for receiving a second word having an upper byte and a lower byte;

a first multiplier coupled to said first and second input ports, said first multiplier receiving the upper bytes of said first and second words and generating a first product equal to the product of said upper bytes;

a second multiplier coupled to said first and second input ports, said second multiplier receiving the lower bytes of said first and second words and generating a second product equal to the product of said lower bytes;

a first gating circuit coupled to said first input port, said first gating circuit receiving the upper byte of said first word and a multiplier select signal, wherein said first gating circuit outputs a first byte, said first byte being equal to the upper byte of said first word when said multiplier select signal is in a first state and said first byte being equal to zero when said multiplier select signal is in a second state;

a second gating circuit coupled to said first input port, said second gating circuit receiving the lower byte of said first word and said multiplier select signal, wherein said second gating circuit outputs a second byte, said second byte being equal to the lower byte of said first word when said multiplier select signal is in said first state and said second byte being equal to zero when said multiplier select signal is in said second state;

a third multiplier coupled to said second input port and said first gating circuit, said third multiplier receiving the lower byte of said second word and said first byte and generating a third product equal to the product of the lower byte of said second word and said first byte; and a fourth multiplier coupled to said second input port and said second gating circuit, said fourth multiplier receiving the upper byte of said second word and said second byte and generating a fourth product equal to the product of the upper byte of said second word and said second byte.

2. The multiplier circuit of claim 1, further comprising:

a first concatenation port coupled to said first and second multipliers, said first concatenation port receiving said first and second products and providing a first concatenated output signal representative of said first product and said second product.

3. The multiplier circuit of claim 2, further comprising:

a first summing circuit coupled to said third and fourth multipliers, said first summing circuit receiving said third and fourth products and generating a first sum equal to the sum of said third and fourth products;

a second concatenation port coupled to said first summing circuit, said second concatenation port receiving said first sum and generating a second concatenated output signal; and a second summing circuit coupled to said first and second concatenation ports, said second summing circuit receiving said first and second concatenated output signals and providing an output signal equal to the sum of said first and second concatenated output signals.

4. The multiplier circuit of claim 1, wherein said first and second words each have n bits and said upper and lower bytes each have n/2 bits.

5. The multiplier circuit of claim 4, wherein said first, second, third and fourth products all have 2*n bits.

6. A multiplier circuit comprising:

a first input port for receiving a first word having an upper byte and a lower byte;

a second input port for receiving a second word having an upper byte and a lower byte;

first multiplier means coupled to said first and second input ports, wherein said first multiplier means generates a first product representative of the product of the upper bytes of said first and second words and the product of the lower bytes of said first and second words;

second multiplier means coupled to said first and second input ports, wherein said second multiplier means generates a second product representative of the product of the upper byte of said first word and the lower byte of said second word plus the product of the lower byte of said first word and the upper byte of said second word;

means for disabling said second multiplier means, thereby setting said second product to zero; and means for adding said first and second products.

7. A method of selectably multiplying a first digital word having an upper byte and a lower byte and a second digital word having an upper byte and a lower byte, said method comprising the steps of:

multiplying the upper byte of said first word with the upper byte of said second word by a first multiplier to create a first product;

multiplying the lower byte of said first word with the lower byte of said second word by a second multiplier to create a second product;

multiplying the upper byte of said first word with a selectable signal to create a first byte;

multiplying the lower byte of said first word with said selectable signal to create a second byte;

multiplying the lower byte of said second word with said first byte by a third multiplier to create a third product;

multiplying the upper byte of said second word with said second byte by a fourth multiplier to create a fourth product; and adding said third and fourth products by a first summing circuit to create a first sum.

8. The method of claim 7, further comprising the step of setting said selectable signal to either one or zero.

9. The method of claim 7, further comprising the step of concatenating said first and second products to form a third word, wherein said first product forms an upper byte of said third word and said second product forms a lower byte of said third word.

10. The method of claim 9, further comprising the step of concatenating said first sum with a plurality of zeros before and after said first sum to create a fourth word.

11. The method of claim 10, further comprising the step of summing said third and fourth words by a second summing circuit to create a multiplication result.

* * * * *